(12) United States Patent
DiVincenzo et al.

(10) Patent No.: US 8,117,000 B2
(45) Date of Patent: Feb. 14, 2012

(54) MEASURING QUANTUM STATES OF SUPERCONDUCTING RESONATORS

(75) Inventors: David DiVincenzo, Yorktown Heights, NY (US); George A. Keefe, Yorktown Heights, NY (US); Shwetank Kumar, Yorktown Heights, NY (US); Matthias Steffen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/507,977

(22) Filed: Jul. 23, 2009

(65) Prior Publication Data

US 2011/0022340 A1 Jan. 27, 2011

(51) Int. Cl.
*G06F 15/00* (2006.01)
(52) U.S. Cl. ......................................................... 702/72
(58) Field of Classification Search ...................... 702/72
See application file for complete search history.

(56) References Cited

U.S. PATENT DOCUMENTS

| 7,135,697 | B2 | 11/2006 | Friesen et al. |
| 7,219,018 | B2 | 5/2007 | Vitaliano et al. |
| 2003/0224944 | A1* | 12/2003 | Il'ichev et al. ................ 505/170 |
| 2007/0295954 | A1 | 12/2007 | Burkard et al. |
| 2008/0310000 | A1* | 12/2008 | Beausoleil et al. ........... 359/108 |
| 2009/0091812 | A1* | 4/2009 | Goto et al. .................... 359/107 |
| 2009/0289638 | A1* | 11/2009 | Farinelli et al. ............... 324/652 |

FOREIGN PATENT DOCUMENTS

WO WO2004086295 A1 10/2004

OTHER PUBLICATIONS

Janice C. Lee et al., "Resonant Readout of a Persistent Current Qubit," IEEE Transactions on Applied Superconductivity, vol. 15, No. 2, Jun. 2005.

* cited by examiner

*Primary Examiner* — Cindy Hien-Dieu Khuu
(74) *Attorney, Agent, or Firm* — Cantor Colburn LLP; Vazken Alexanian

(57) ABSTRACT

A method for measuring the quantum state of a resonator includes, exciting an input port of a circuit with signal, measuring a phase shift of the signal at an output port of the circuit, wherein the resonator is coupled to the input and the output ports, and calculating a quantum state of the resonator as a function of the measured phase shift of the signal.

19 Claims, 4 Drawing Sheets

MEASURING QUANTUM STATES OF SUPERCONDUCTING RESONATORS

FIELD OF INVENTION

The present invention relates to quantum computing, and more specifically, to a system and method for measuring the quantum state of superconducting resonators.

DESCRIPTION OF RELATED ART

Superconducting resonators are often used in circuits for quantum computers. Methods for measuring the state of a superconducting resonator include coupling the resonator to a qubit and implementing a dispersive readout, and transferring the resonator state to the qubit and reading the state with a DC Superconducting Quantum Interference Device (SQUID). Previous methods of measuring the quantum state of a resonator may undesirably change the quantum state; and transferring the resonator state to the qubit and the DC SQUID is a cumbersome and relatively time consuming process.

BRIEF SUMMARY

According to one aspect of the present invention, a method for measuring the quantum state of a resonator includes, exciting an input port of a circuit with signal, measuring a phase shift of the signal at an output port of the circuit, wherein the resonator is coupled to the input and the output ports, and calculating a quantum state of the resonator as a function of the measured phase shift of the signal.

According to another aspect of the present invention, a system for measuring the quantum state of a resonator includes a nonlinear resonator coupled to an input and an output port, a signal generating device connected to an input port of the circuit to excite the resonator with a signal, a signal measuring device connected to an output port of the circuit, and a processor operative to measure a phase shift of the signal and calculate the quantum state of the resonator as a function of the phase shift.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
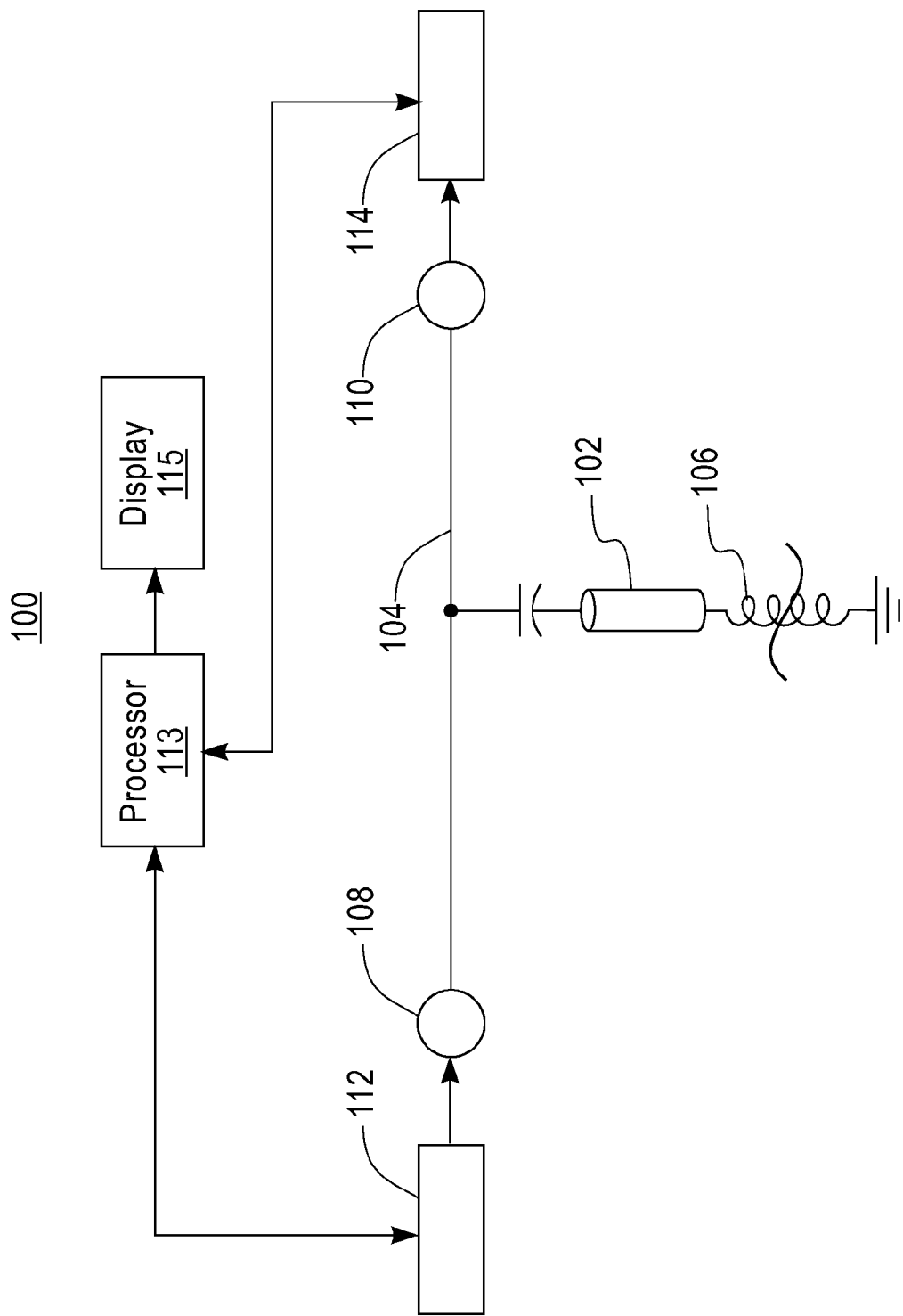
FIG. 1 illustrates an exemplary embodiment of a system for measuring the quantum state of a superconducting resonator.

A method and system for measuring the quantum state of a superconducting resonator by performing microwave readout is described below. FIG. 1 illustrates an exemplary embodiment of a circuit having a quantum state that may be read using the methods described below. The method described allows the determination of the quantum state of the first mode of the resonator by measuring the shift in frequency response of the resonator at a second mode. The method allows the quantum state of a resonator to be determined without undesirably changing the quantum state of the resonator.

In this regard, FIG. 1 includes a system 100 having a resonator 102 that may include, for example, a transmission line resonator, a distributed half-wave resonator, lumped element resonator coupled to a feed line 104, and terminated to ground through a nonlinear element 106. The nonlinear element is a reactive element having capacitive or inductive properties. Examples of a nonlinear element include a nonlinear inductor, RF SQUID, JJ SQUID, DC SQUID, quantum dots, or a qubit. The feed line is connected to an input port 108 and an output port 110. The input port 108 is connected to a microwave emitting device 112, such as, for example, a microwave frequency synthesizer or a network analyzer that is capable of emitting a range of microwave frequencies that excite the system 100. The output port 110 is connected to a microwave measuring device 114 that may include, for example, a network analyzer or a homodyne detection circuit that operates to measure the response of the system 100. The system 100 may include a processor 113 and a display 115. The processor 113 may be connected internally or externally to the microwave emitting device 112 and/or the microwave measuring device 114.

In the illustrated example, the resonator 102 is designed to have at least two modes with a typical frequency of the fundamental mode $f_r$~6 GHz. The next relevant mode of the device is approximately three times the fundamental mode of $f_{3r}$~18 GHz. In operation, the resonator response is measured as a function of the readout frequency f by exciting the input port 108 of the feed line 104 with a microwave signal from the microwave emitting device 112 and detecting the signal at the output port 110 with the microwave measuring device 114.

The forward scattering parameter ($S_{21}$) may be measured and used to determine the quantum state of the resonator 102. For excitation frequencies far from the resonance frequencies of the resonator 102 $|S_2|=1$. At $f \approx f_r$, $f_{3r}$, the resonator 102 loads the through line resulting in a transmission null and $|S_{21}|$ approaches 0 for a high quality factor resonator. As the microwave signal at $f \approx f_r$ or $f_{3r}$ travels past the resonator 102, the microwave signal incurs a phase shift. The resonance frequency of the resonator 102 is dependent on the energy stored in the resonator 102 due to the nonlinear element 106 that connects the resonator to ground. As the energy in the fundamental mode (or equivalently the quantum state of the resonator 102) changes, the resonance frequencies of the resonator 102 shift. The shift causes the phase shift of the measurement microwave signal ($f \approx f_{3r}$) as the microwave signal travels past the resonator 102 to change.

The method described above is not limited to the example frequencies and modes. For example, the roles of the $f_r$ and $f_{3r}$ modes are interchangeable, thus the phase shift at the $f_r$ mode could be used to measure the energy in the $f_{3r}$ mode (or another mode). The degree of incommensurability of the two mode frequencies can be increased by increasing the average terminating inductance relative to the characteristic frequency of the transmission line. The pair of modes does not necessarily include the fundamental mode, for example the pair of modes may include the second and third mode of a quarter-wave resonator with example frequencies 2 GHz, 6 GHz, and 10 GHz. The frequencies may be scaled up or down for cooling or amplifier bandwidth considerations. The degree of nonlinearity from the nonlinear element 106 may be enhanced by placing the plasma frequency of the nonlinear element 106 close to a multiple of the measured mode. Alternate measurement schemes may be used for example, measuring a reverse scattering parameter $S_{11}$. Multiple resonators with different resonance frequencies each attached to a different nonlinear element may be coupled to the same feedline in a frequency division multiplexed arrangement to measure many resonators simultaneously.

Figure 2:
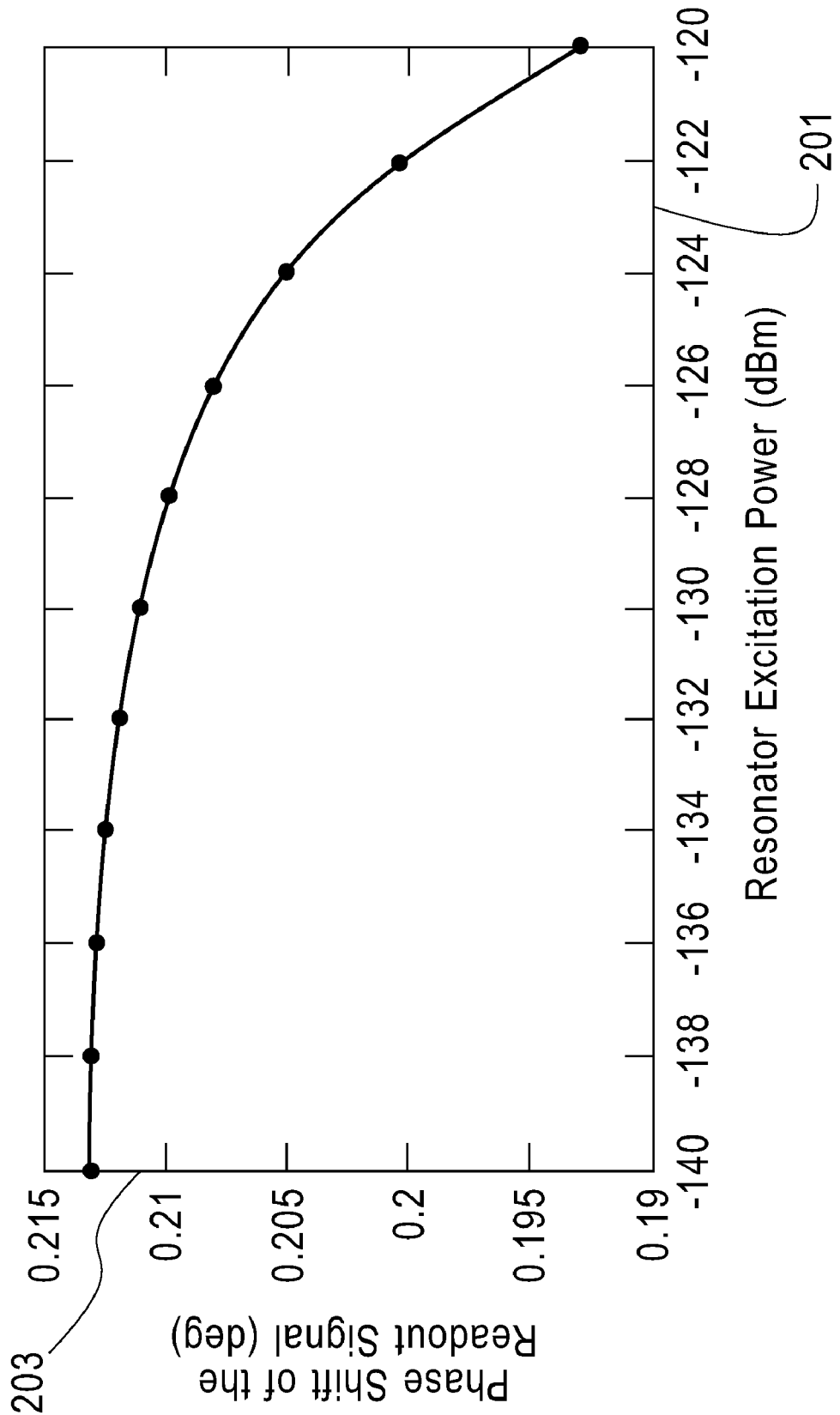
FIG. 2 illustrates example simulation results of a system similar to the system of FIG. 1.

FIG. 2 illustrates a simulated response of a device similar to the circuit 100. The power used to excite the resonator at the fundamental frequency is shown on the x-axis (201). The power used to excite the resonator at the fundamental frequency is related to the energy residing in the fundamental mode of the resonator 102 through a scaling $Q_r/2\pi f_r$, wherein $Q_r$ is the resonator quality factor. The energy resident in the fundamental mode of the resonator 102 corresponds to the quantum state of the resonator 102 and is equal to $E_n = nhf_r$, where n is the quantum number of the state and h is the Plank's constant. The function of the relationship between the measured phase shift and the quantum state of the resonator may be determined by experimentation and applied to a given circuit design. The y-axis (203) shows the change in the phase shift of the microwave signal at the readout frequency (close to $f_{3r}$). Measured using the microwave measuring device 114.

Figure 3:
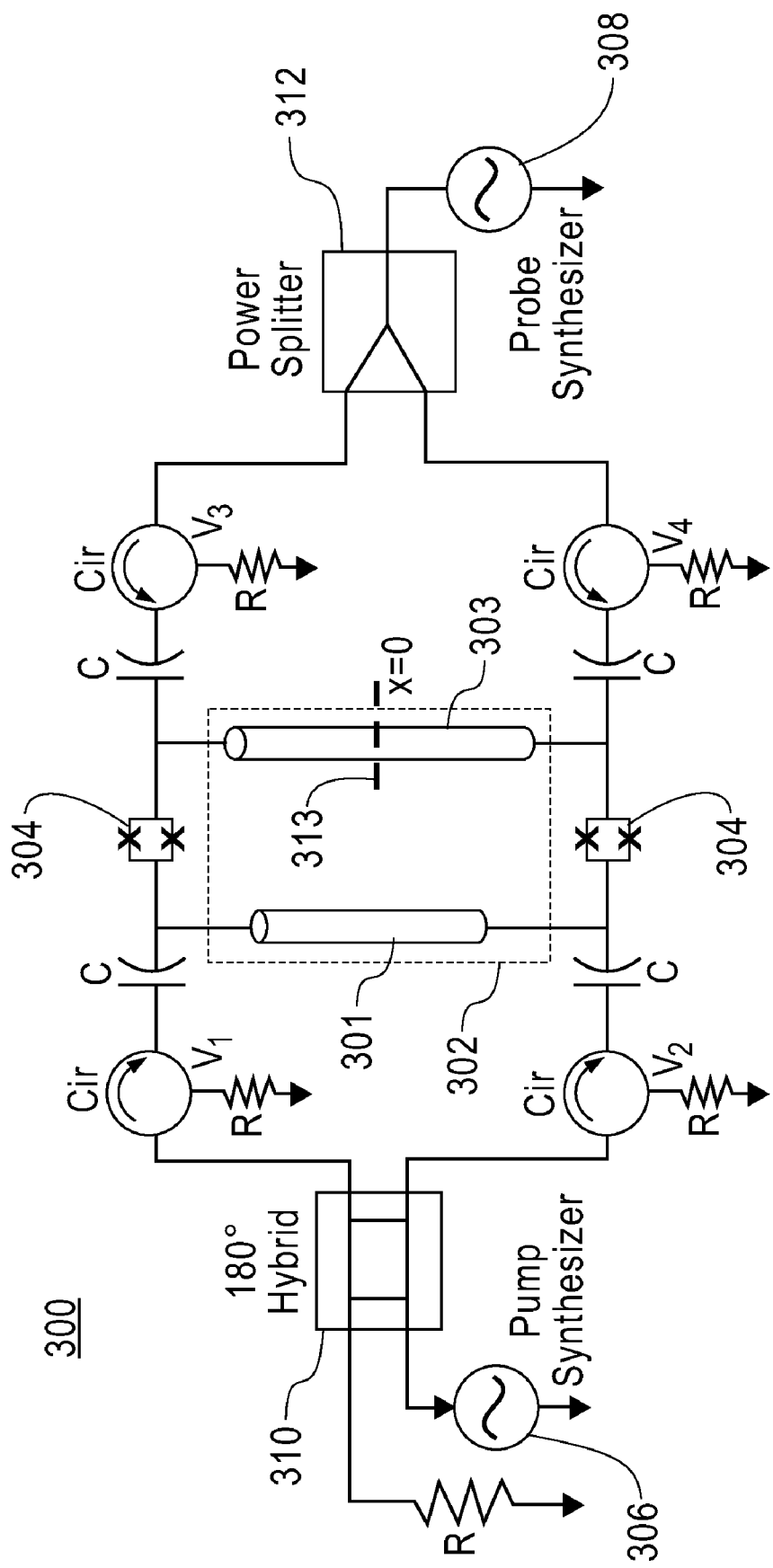
FIG. 3 illustrates an alternate exemplary embodiment of a system for measuring the quantum state of a superconducting resonator.

FIG. 3 illustrates a system 300 that is an alternate exemplary embodiment of the circuit described above. The resonator 302 includes two transmission lines 301 and 303. The transmission lines 301 and 303 are connected to nonlinear elements 304. The system 300 includes a pump synthesizer 306, a probe synthesizer 308, a 180-degree hybrid 310, and a power splitter 312. In operation, the 180-degree hybrid 310 causes the pump synthesizer 306 to couple to ring modes with an odd voltage profile with respect to the x=0 line 313; while the power splitter 312 causes the probe synthesizer 308 to couple to even modes. The quantum state of one mode of the resonator 302 can be determined by measuring the phase shift of the signal exciting another mode.

Figure 4:
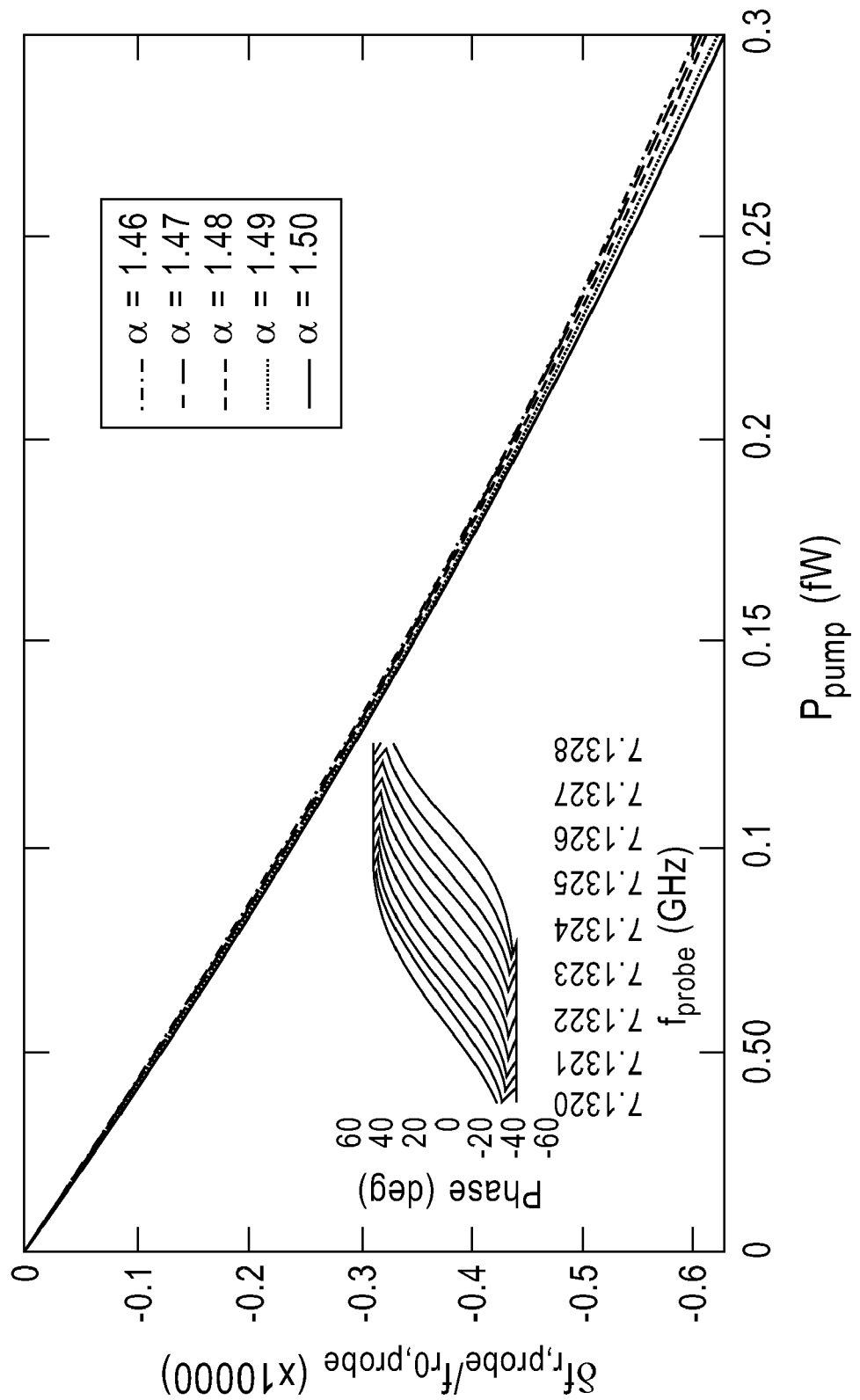
FIG. 4 illustrates an example of a simulated response of the system of FIG. 3.

FIG. 4 illustrates an example of a simulated response of the system 300 (of FIG. 3). In the illustrated example, $\alpha = 3/2$, where $\alpha$ is determined by the relative lengths of the transmission lines 301 and 303. The inset graph 401 illustrates the phase response of as pump synthesizer 306 power is swept from 0 to 0.3 fW in steps of 0.03 fW. The nearly linear shift of the phase profile with the pump synthesizer 306 power demonstrates the cross-Kerr effect.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for measuring the quantum state of a resonator comprising:
   exciting an input port of a circuit with signal;
   measuring a phase shift of the signal at an output port of the circuit, wherein the resonator is coupled to the input and the output ports; and
   calculating a quantum state of the resonator as a function of the measured phase shift of the signal.

2. The method of claim 1, wherein the resonator has at least a first resonance mode and a second resonance mode.

3. The method of claim 2, wherein the measured phase shift is induced in the excitation signal for second mode resonance is indicative of the quantum state of the first mode resonance.

4. The method of claim 2, wherein the calculated quantum state of the resonator corresponds to the quantum state of the resonator at the first resonance mode.

5. The method of claim 1, wherein the resonator is capacitively coupled to the output ports.

6. The method of claim 1, wherein the resonator is a transmission line resonator.

7. The method of claim 1, wherein the resonator is a lumped element resonator.

8. The method of claim 1, wherein the resonator is a ring resonator.

9. The method of claim 1, wherein the nonlinear element is reactive.

10. A system for measuring the quantum state of a resonator comprising:
    a nonlinear resonator coupled to an input and an output port;
    a signal generating device connected to an input port of the circuit to excite the resonator with a signal;
    a signal measuring device connected to an output port of the circuit; and
    a processor operative to measure a phase shift of the signal and calculate the quantum state of the resonator as a function of the phase shift.

11. The system of claim 10, wherein the nonlinear resonator is capacitively coupled to the input port and the output port via a feedline.

12. The system of claim 10, wherein the nonlinear resonator is a transmission line resonator.

13. The system of claim 10, wherein the nonlinear resonator is a quarter-wave resonator.

14. The system of claim 10, wherein the signal is a microwave signal.

15. The system of claim 10, wherein the nonlinear resonator is connected to ground via a nonlinear inductor.

16. The system of claim 15, wherein the nonlinear inductor is operative to couple at least two modes of the resonator.

17. The system of claim 10, wherein the resonator has at least a first resonance mode frequency and a second resonance mode frequency.

18. The system of claim 17, wherein the measured phase shift is induced when a frequency of the signal approaches the second resonance mode frequency.

19. The system of claim 17, wherein the calculated quantum state of the resonator corresponds to the quantum state of the resonator at the first resonance mode frequency.

* * * * *